Patented Oct. 10, 1939

2,176,022

UNITED STATES PATENT OFFICE 2,176,022

PRESERVATION OF ORGANIC MATERIALS CONTAINING OILS

Sidney Musher, New York, N. Y., assignor to Musher Foundation Incorporated, New York, N. Y., a corporation of New York No Drawing. Application April 19, 1939,
Serial No. 268,766

7 Claims. (Cl. 23—239)

This invention relates to the preservation of organic materials containing glyceride oils and fats of animal or vegetable origin and subject to oxidative deterioration and development of rancidity.

Although not limited thereto, the present invention will be particularly described in connection with the preservation of various organic materials, containing minor proportions of or small amounts of animal and vegetable oils and fats subject to development of rancidity, by the use of antioxygens present and embedded in the meal portions of finely divided raw or unbleached cereals, desirably dry milled and in flour form.

The preferred unbleached cereal flours for use in accordance with this invention are derived from oats, degerminated maize or barley. In the case of oats, they may be decorticated or dehulled.

In the preferred form of this invention the finely divided unbleached flour itself is thoroughly mixed with and dispersed throughout the body of the oil containing organic material to be preserved which may be a liquid, a paste, a ground material, or a pulverized or powdered material. It is also possible to segregate the water soluble antioxygens by removing the fibre, starch, and water insoluble portions of these cereal flours. This segregation of the water soluble antioxygens is desirably accomplished by mixing the flour with water or aqueous liquids at temperatures up to about 140° F. for a few minutes, preferably at a pH of about 6, followed by decantation, siphoning, centrifuging or filtration. Where desired, these antioxygens may be concentrated preferably under reduced pressure to more than 40% total solids, or even to powdered or dried form, in which latter case it is desirable to mix with carriers such as powdered skim milk, sugar, salt, etc.

An alcohol soluble extract may also be made containing the alcohol soluble antioxygens present in oats, degerminated maize or barley, and such extract may be prepared in a similar manner using methyl alcohol, ethyl alcohol or similar alcohols and removing substantially all of the alcohol by vacuum distillation.

To obtain the desired preservative effect, the oat, maize or barley flour is added to and dispersed in organic materials containing oils such as cod liver, sperm, castor, neat's-foot or olive oil emulsions to be used for medicinal purposes or for softening or finishing textiles, leather, and similar compositions, butterfat dispersions or emulsions including milk, cream, ice cream, cream cheese, etc., fatty fish meals and meat scrap containing animal glyceride oils or fats in ground or finely divided form, ground wood pulp containing natural oils subject to decomposition, such as ground pine pulp containing pine oils which are subject to rapid deterioration, medicinal oil or fat containing emulsions, mayonnaise, frozen or dried egg yolk, etc. These products may be edible or inedible.

The preferred application of the present invention is to organic materials containing minor proportions, say 50% or less, of an oil, and particularly a glyceride oil or fat of animal or vegetable origin, although the organic material may contain other percentages of said oil or fat.

Where the organic material is substantially in a liquid or pasty aqueous condition and in which the oil or fat is contained in a disperse phase in such aqueous organic material, the oat, maize or barley antioxygens may desirably be added direct to and mixed in such aqueous continuous phase to stabilize the fat or oil in the disperse phase and will often give better protection than where said antioxygens are added directly to the pure undispersed or unemulsified oil or fat.

Of distinct advantage in the use of these cereal flours is the fact that they are not only substantially effective from the standpoint of their preservative properties and characteristics, but, in addition, they are bland in flavor and light in color and may therefore be most desirably employed with organic oil containing compositions without changing the normal odor, appearance or flavor of such organic compositions. In addition, these cereal flours are substantially devoid of oil and are not used for the commercial expression or extraction of oils and they contain less than about 0.75% of lecithin. The absence of oily or pasty characteristics in these cereal flours is particularly desirable where the oil containing organic composition is in substantially aqueous condition and with the oil contained in the disperse phase thereof, in view of the fact that the cereal flour is readily miscible with and the antioxygens contained therein may be dissolved in the aqueous continuous phase thereof in order to protect the disperse oil or fat phase.

The amount of the cereal flour to be used will be less than about 10% and in most cases will be less than 5%. For many organic oil containing compositions as little as 1% or even 0.5% will be sufficient to give substantial preservative effect. Naturally, the amount of the cereal flour to be employed will depend upon the oil containing organic composition to be preserved and the susceptibility of that composition to deterioration.

The present invention is particularly directed to the antioxygenic elements or antioxygens contained in the meal portions of oats, degerminated maize and barley and most particularly in oat and degerminated maize flour.

The oat, degerminated maize and barley cereals proposed for use as preservative substances differ markedly from such materials as lecithin, crude vegetable oils, etc. in that such cereals are not deactivated when heated to elevated temperatures such as to in excess of 250° F., and such cereals are substantially crude oil-free and lecithin-free and are lacking in objectionable odor and flavor. Moreover, they are not objectionable from a food viewpoint and are not generally considered as adulterants. Moreover, where the inclusion of a foreign oil would normally be objectionable the addition of these substantially oil-free flours would be most advantageous.

These cereals also may withstand high heat without loss of preservative activity and this is of extreme importance with products that are normally processed at elevated temperatures sufficient to inactivate lecithin, crude oil and other similar substances. For example, these cereals may be employed by adding to milk or cream prior to heating said milk or cream at 145° F. for 30 minutes and above and particularly prior to heating to such temperatures as 250° F. or above without substantial loss of antioxygenic activity.

In the case of those oil containing organic compositions which must be subjected to concentration or drying in the course of their normal manufacturing procedures, it is particularly desirable for the oat, degerminated maize or barley flour to be added to such compositions and thoroughly admixed therein before such concentration or drying. They however may also be added to the products after partial or complete dehydration and they may also be ground into the oily product to be preserved.

The following examples are indicative of the effectiveness of these cereal flours in retarding deterioration of oil containing organic compositions.

Example I

A cod liver oil emulsion was prepared by slowly adding with agitation 30% by weight of cod liver oil to 70% of glucose syrup. To one lot of this emulsion there was added and thoroughly dispersed therein 3% by weight of finely divided unbleached dehulled oat flour of 72 mesh. Samples of both the treated and untreated cod liver oil emulsion were set aside in open containers at room temperature and peroxide values taken of the oil extracted from the emulsions by use of petroleum ether at regular intervals

|  | Peroxides after— | | |
|---|---|---|---|
|  | 30 days | 60 days | 90 days |
| Untreated oil | 14.5 | 60.4 | 173.0 |
| Treated oil | 7.5 | 22.0 | 53.2 |

Example II

Pine wood stock containing 60% total moisture and a small amount of pine oil as used in the manufacture of pine wood pulp board was removed from the wet end of the board making machine. To one lot of that stock was added 1% by weight of dry milled maize flour of approximately 50 mesh and thoroughly mixed in throughout the body of the wood stock. After thorough admixture, the stock was dried in a vacuum oven at 65° C. together with samples of the untreated stock and samples were set aside in closed containers at room temperature. Within about 4 days the untreated pine stock had an objectionable rancid odor characteristic of old cardboard whereas this odor did not develop in the treated pine board within a period of about 2 weeks.

Example III

A food emulsion was prepared comprising 7.5% egg yolk, 0.5% gum tragacanth, 65% deodorized cottonseed oil, 1.0% vinegar with added salt, sugar and pepper. The egg yolk, tragacanth, salt, sugar and pepper were first thoroughly admixed and then the oil was added followed by the addition of the vinegar. This produced an oil-in-water type of emulsion with the egg yolk and tragacanth occupying the film protecting the oil globules and the water occupying the continuous phase. To another lot of the same emulsion there was added 1.0% by weight of finely milled dehulled oat flour, the oat flour being added to and mixed in the finished emulsion so that it was spread through the aqueous phase of that emulsion.

Samples of the treated and untreated food emulsions were set aside in closed containers at room temperature and observed regularly. The sample containing the oat flour retained its fresh characteristics for about 80% longer than the sample of the food emulsion which was free of the oat flour.

Example IV

Liquid egg yolk containing 23% total glyceride oils in the disperse phase thereof was dried in a vacuum oven at 65° C. To one sample of the egg yolk there was added and thoroughly admixed therein before drying 1.5% by weight of dehulled unbleached oat flour and then dried in the vacuum oven at 65° C. Samples of the treated and untreated dried egg yolk were set aside in open containers at room temperature. The untreated dried egg yolk developed an off flavor in 22 days and was distinctly rancid in 26 days. The sample containing the oat flour developed an off odor in 38 days and became rancid in 43 days.

Example V

To a sample of finely ground mackerel containing 22% of mackerel oil on its solids weight basis was added and thoroughly dispersed therein 1.0% of unbleached pulverized whole oats. Samples of the ground mackerel treated in this manner as well as samples from the same lot which were free of the whole oats were dried in a vacuum oven at 65° C. These fish meals were then set aside in open containers at 125° F. and observed for rancidity. The sample of fish meal containing the pulverized oats kept approximately 2½ times longer than the sample which was free of the oats.

Example VI

Squares of silk 12" x 12" were subjected to a sulphonated oil treatment using 5% of maize flour against the weight of the oil and in another set merely omitting the maize flour, the oil employed being sulphonated olive oil. The silks were then washed and cleansed in the normal manner and set aside in closed containers. These silks were examined after 30 days. Those samples which had been treated with maize flour were unaltered in odor and appearance. Those samples which were not treated with the maize flour had a noticeable rancid odor and showed a slight discoloration indicative of rancidity.

*Example VII*

Strawberry ice cream mix containing 11% fat was pasteurized in a copper pan at 145° F. for 30 minutes and then added to a batch freezer. To one lot of the mix there was slowly added and mixed in at the freezer 0.4% by weight of dehulled unbleached oat flour. Another lot of the same mix was frozen without the oat flour having been added to it. The ice creams were stored at 15° F. and tasted at regular intervals for development of oxidative flavors. The following results were obtained, the number of + signs indicating the degree of oxidative flavor.

|  | After— | | |
|---|---|---|---|
|  | 2 weeks | 4 weeks | 6 weeks |
| Untreated ice cream | ++ | ++++ (inedible) | ++++ (inedible) |
| Treated ice cream | − | + | ++ |

*Example VIII*

To cream containing 35% butterfat in the disperse phase was added and thoroughly admixed therein 0.25% by weight of dehulled unbleached oat flour. The cream was then heated to 150° F. for 30 minutes and cooled.

One lot of the cream was frozen at −10° F. and tested for development of oxidative flavors at intervals in comparison with the untreated cream to which no oat flour had been added.

|  | After— | | |
|---|---|---|---|
|  | 2 months | 4 months | 6 months |
| Untreated cream | − | + | ++ |
| Treated cream | − | − | ± |

Another lot of the same cream was churned into butter as a result of which the butterfat globules left the disperse phase and became coagulated with other butterfat globules. Substantially all the oat flour was washed out into the buttermilk leaving the finished butter free of the oat flour which had been mixed in the aqueous continuous phase of the cream. The butter thus produced was compared in keeping quality with butter made from the same cream but to which no oat flour had been added. The butters were held at 50° F. and scored at intervals, the scoring ranging from 86 as the lowest score to 94 as the highest score.

|  | Score after— | | | |
|---|---|---|---|---|
|  | 0 weeks | 3 weeks | 6 weeks | 9 weeks |
| Butter from untreated cream | 92 | 91.5 | 90.5 | 89 |
| Butter from treated cream | 92 | 92 | 91.25 | 90.5 |

*Example IX*

To powdered egg yolk containing about 40% fat was mixed in powdered form 2% of 70 mesh unbleached dehulled oat flour. The powdered egg yolk containing the oat flour remained free of rancidity for about twice as long as a similar grade of powdered egg yoke which did not contain the oat flour.

In the segregation of the water and alcohol soluble antioxygens from the meal portions of these cereal flours, there are obtained mixtures which include organic nitrogen and phosphorus and also water soluble carbohydrate materials. These mixtures are preferably substantially free of the starch and fibre portions of these substantially oil-free and lecithin free cereals. The unbleached cereals that are used for extraction are those which have not been previously extracted with either water or alcohol or treated to destroy the antioxygenic values contained therein.

The water or alcohol soluble antioxygenic components that are particularly utilized in accordance with this invention for addition to the oil containing organic compositions are those which are embedded in the meal portions of the oats and degerminated maize, and which may be readily removed by extraction procedures.

*Example X*

A concentrated water extract of degerminated maize flour was made by mixing 9 parts by weight of water adjusted to a pH of 6.0 with 1 part by weight of maize flour at 135° F. for 30 minutes, centrifuging to remove the insoluble maize portions, and concentrating the centrifuged water soluble fraction in a stainless steel vacuum pan at 135° F. under a vacuum of 25 inches to a total solids content of 70%. The extract thus obtained was added to milk in an amount of 0.04% against the weight of the milk and the milk then heated to 163° F. for 16 seconds. The milk was then held at 50° F. and tested for development of oxidized flavors in comparison with untreated milk.

|  | Oxidized flavors after— | | |
|---|---|---|---|
|  | 24 hours | 48 hours | 72 hours |
| Untreated milk | − | + | ++ |
| Treated milk | − | − | − |

*Example XI*

An ethyl alcoholic extract of unbleached pulverized whole oats was prepared by immersing 1 part of the pulverized oats in 7 parts of ethyl alcohol by weight, thoroughly agitating for 30 minutes, filtering off the alcohol and boiling off the alcohol from the alcohol soluble fraction under 25 inches of vacuum and at a temperature of 125° F. The extract thus obtained was thoroughly mixed in an amount of 0.5% by weight with ground freshly roasted coffee. The coffee thus treated was found to be very resistant to staleness and loss of fresh flavor and aroma when compared with similar untreated ground coffee.

The present application is a continuation in part of and is a substitute for applications Serial No. 799, filed January 7, 1935, Serial No. 15,307, filed April 8, 1935, and Serial No. 233,027, filed October 3, 1938.

In the present application is broadly disclosed the preservation of organic glyceride oil containing compositions with both the unbleached flours themselves and their segregated antioxygens derived from their meal portions and containing water soluble carbohydrates and organic nitrogen and phosphorus compounds, this application being specifically directed to the use of the unbleached flours themselves. The copending application Serial No. 255,775 filed February 10, 1939, is specifically directed to the water and alcohol soluble extracts as used in the preservation of organic materials. The copending application Serial No. 261,667, filed March 13, 1939, is specifically directed to the water extracted antioxygens of maize and oats and to specific procedures utilized in such extractions.

By oily or oleaginous constituent is included particularly such glyceride oils or fats which may be dispersed in a liquid, paste, or powdered, pulverized or ground solid material and which are subject to oxidative deterioration. Although the addition of the flours or their segregated meal antioxygens is primarily of value in preventing development of rancidity or similar oxidative deterioration, they are also of additional value in preventing or retarding other forms of deterioration such as protein decomposition or putrefaction, as in the case of the protein decomposition of ground or pulverized fatty fish meals, oxidative discoloration as in the case of fruits and fruit juices, development of off-odors, tastes and flavors, etc. Having described my invention, what I claim is:

1. A glyceride fat or oil containing composition subject to oxidative deterioration, substantially stabilized against such deterioration by adding thereto and incorporating therein a sufficient amount, less than 5%, of an unbleached cereal flour selected from the group consisting of oats, maize and barley to preserve the glyceride.

2. A process of substantially preserving and stabilizing organic materials containing glyceride oils and fats subject to deterioration upon standing, which comprises adding to and incorporating in said materials a sufficient amount, less than 5%, of a finely divided unbleached cereal flour selected from the group consisting of oats, maize and barley to preserve the glyceride oils and fats.

3. An organic composition containing a glyceride subject to oxidative deterioration and rancidity which has been stabilized against such deterioration by having incorporated and thoroughly dispersed therein a sufficient amount of a finely divided unbleached cereal flour selected from the group consisting of oats, maize and barley to preserve the glyceride.

4. An aqueous organic composition containing a glyceride oil dispersed throughout the body thereof and also containing a sufficient amount of a finely divided unbleached cereal selected from the group consisting of oats, maize and barley to preserve the glyceride, said cereal being also dispersed throughout the body of said composition.

5. A finely divided solid organic material containing a glyceride oil subject to oxidative deterioration, said material being subject to oxidative deterioration because of the presence of said glyceride oil, said material also containing a sufficient amount, less than 5%, of a substantially oil-free and lecithin-free finely divided unbleached cereal thoroughly dispersed therethrough, said cereal being selected from the group consisting of oats, maize and barley, to preserve said material against such oxidative deterioration.

6. An organic composition containing dispersed throughout the body thereof a minor amount of a glyceride oil, less than 50%, said composition being subject to deterioration because of the presence of said oil, and said composition also containing thoroughly dispersed throughout the body thereof a sufficient amount, less than 2%, of finely divided unbleached dehulled oats to preserve said composition.

7. A process of substantially preserving and stabilizing organic materials containing glyceride oils and fats, subject to oxidative deterioration, which comprises adding to and thoroughly dispersing throughout the body of said materials a sufficient amount of a finely divided unbleached cereal flour selected from the group consisting of oats, maize and barley to preserve the glyceride oils and fats.

SIDNEY MUSHER.